(12) United States Patent
Sato et al.

(10) Patent No.: US 11,919,570 B2
(45) Date of Patent: Mar. 5, 2024

(54) LOWER STRUCTURE OF ELECTRIC VEHICLE

(71) Applicant: Mazda Motor Corporation, Hiroshima (JP)

(72) Inventors: Masanao Sato, Hiroshima (JP); Katsutoshi Noguchi, Hiroshima (JP); Tomokazu Murakami, Hiroshima (JP); Yudai Kawaguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 258 days.

(21) Appl. No.: 17/665,592

(22) Filed: Feb. 7, 2022

(65) Prior Publication Data

US 2022/0306204 A1    Sep. 29, 2022

(30) Foreign Application Priority Data

Mar. 26, 2021 (JP) ................. 2021-053425

(51) Int. Cl.
  *B62D 21/11* (2006.01)
  *B60K 1/00* (2006.01)
  (Continued)

(52) U.S. Cl.
  CPC ................ *B62D 21/11* (2013.01); *B60K 1/00* (2013.01); *B60K 1/04* (2013.01); *B60K 5/00* (2013.01);
  (Continued)

(58) Field of Classification Search
  CPC .... B62D 21/11; B62D 25/2045; B62D 25/20; B60R 16/0215; B60R 16/02; B60R 16/00; B60R 16/0217; B60L 15/007; B60Y 2400/61; B60Y 2410/115; B60K 1/00; B60K 1/04; B60K 2001/005; B60K 2001/006; B60K 2001/0438; B60K 2001/003; B60K 2001/0405; B60K 5/00; B60K 11/00; B60K 11/02
  See application file for complete search history.

(56) References Cited

U.S. PATENT DOCUMENTS 6,598,691 B2 * 7/2003 Mita ................. B60L 50/51
                                                  180/68.5
8,770,326 B2 * 7/2014 Matano .............. B60K 1/00
                                                  180/65.1
(Continued)

FOREIGN PATENT DOCUMENTS

JP    2019-188899 A    10/2019
JP    2020-172879 A    10/2020

*Primary Examiner* — James M Dolak
(74) *Attorney, Agent, or Firm* — XSENSUS LLP

(57) ABSTRACT

To simultaneously avoid contact with a front subframe and secure a connection space for a harness, a front subframe has a right and left pair of side frame sections, each of which is located in front of and below a dashboard. A converter and a vehicle component are provided behind a rear end portion of one of the side frame sections. The converter is arranged along a lower surface of a floor panel, and the vehicle component is arranged adjacent to rear of the converter. The converter is arranged in a vertically inclined state, a front-end portion of the converter is located higher than the rear end portion of the side frame section, and a rear end portion of the converter is located lower than the vehicle component.

17 Claims, 8 Drawing Sheets

(51) Int. Cl.
   *B60K 1/04*   (2019.01)
   *B60K 5/00*   (2006.01)
   *B60K 11/02*  (2006.01)
   *B60R 16/02*  (2006.01)

(52) U.S. Cl.
   CPC .......... *B60K 11/02* (2013.01); *B60R 16/0215*
         (2013.01); *B60K 2001/005* (2013.01); *B60K*
                  *2001/006* (2013.01); *B60K 2001/0438*
                                             (2013.01)

(56) References Cited

U.S. PATENT DOCUMENTS

| | | | | |
|---|---|---|---|---|
| 8,839,895 | B2* | 9/2014 | Kato | B60K 1/04 |
| | | | | 180/68.5 |
| 9,260,065 | B2* | 2/2016 | Tanigaki | B60R 16/0215 |
| 9,688,153 | B2* | 6/2017 | Yamamoto | B60L 3/0061 |
| 9,873,456 | B2* | 1/2018 | Hara | B60K 1/04 |
| 10,183,564 | B2* | 1/2019 | Okada | B60L 50/66 |
| 10,381,620 | B2* | 8/2019 | Takahashi | H01M 10/66 |
| 10,434,897 | B2* | 10/2019 | Sugitate | H01M 10/615 |
| 11,329,343 | B2* | 5/2022 | Iwata | B60L 50/66 |
| 11,387,503 | B2* | 7/2022 | Katayama | H01M 10/6556 |
| 11,654,762 | B2* | 5/2023 | Kohara | B60K 13/04 |
| | | | | 180/65.21 |
| 11,801,742 | B2* | 10/2023 | Yaita | H01M 50/204 |
| 2019/0322164 | A1 | 10/2019 | Sasaki et al. | |

* cited by examiner

LOWER STRUCTURE OF ELECTRIC VEHICLE

CROSS-REFERENCE TO RELATED APPLICATION

The present application claims priority to Japanese application number 2021-053425 filed in the Japanese Patent Office on Mar. 26, 2021, the entire contents of which is incorporated herein by reference.

TECHNICAL FIELD

A disclosed technique relates to a lower structure of an electric vehicle, such as a hybrid vehicle or an electric car, capable of traveling by using electric power.

BACKGROUND

A hybrid vehicle is disclosed in Patent document 1. In typical hybrid vehicles, an inverter, a converter, and a battery are high-voltage driving components and are arranged under a floor panel. More specifically, a 48-V battery is arranged inside a tunnel section. In a proximal state in a front-rear direction, the inverter and the converter are arranged in series in an area on a left side of the tunnel section.

The converter, which is located behind the inverter, is arranged at a lower position than the inverter. A fuel filter is arranged further behind the converter. The fuel filter is arranged at a position that is significantly away from the converter.

Patent document 2 discloses an electric vehicle. In typical electric vehicles, a battery pack is mounted under a vehicle body floor, and the battery pack is arranged in vicinity of and behind a front subframe. A front-end portion of the battery pack is supported by a pair of brackets.

In the case where the front subframe is retreated due to a frontal collision of the electric vehicle, a rear end portion of the front subframe comes into contact with each bracket. The front subframe is configured that the rear end portion thereof is thereby guided obliquely downward by each bracket and falls without contacting the front-end portion of the battery pack.

PATENT DOCUMENTS

[Patent document 1] JP-A-2020-172879
[Patent document 2] JP-A-2019-188899

SUMMARY

Problems to be Solved

In general, the high-voltage driving components are connected by a bundle of cables (a so-called harness). In addition, there is a case where a pipe for delivering cooling water is connected to the high-voltage component, cooling of which is required. Work of connecting these harness and pipe is generally performed after the high-voltage components are attached to a vehicle body.

In the case where plural vehicle components are aligned in the front-rear direction under a side portion of the floor panel, the high-voltage component may have to be attached in front of and in vicinity of the vehicle component, which is attached to the floor panel. In such a case, in order to connect the harness and the like, the high-voltage component has to be arranged at a lower position than the vehicle component.

In addition, in the case where the high-voltage component is attached to a front-end portion of the floor panel, the front subframe is located in vicinity of and in front of the high-voltage component. Accordingly, in the case where the high-voltage component is arranged at the low position, there is concern that the front subframe comes into contact with the high-voltage component when the front subframe is retreated due to a collision or the like.

In regard to such a point, in the electric vehicle disclosed in Patent document 2, the bracket that supports a front side of the battery pack is arranged between the battery pack and the front subframe. In the technique disclosed in Patent document 2, the above contact can be avoided by devising a shape of the bracket.

However, it is more common that such a bracket is not provided between the high-voltage component and the front subframe. In such a case, the number of components is increased by providing a separate protective member. Cost of members and man-hours are also increased.

In view of the above, a disclosed technique simultaneously avoids contact of a high-voltage component with a front subframe and secures a connection space for a harness and the like without providing a separate protective member by devising a method for attaching the high-voltage component.

Solutions to the Problems

A disclosed technique relates to a lower structure of an electric vehicle on which a high-voltage driving battery is mounted and which can travel by using electric power of the high-voltage driving battery.

A lower structure of the electric vehicle includes: a floor panel that expands in a lower portion of a cabin; a dashboard that continues from a front edge portion of the floor panel and divides a front portion of the cabin; a front subframe that has a right and left pair of side frame sections, each of which extends in a front-rear direction at a position in front of the dashboard, and a rear end portion of each of which is located below the dashboard; a specified high-voltage component that is connected to the high-voltage battery and is arranged along a lower surface of the floor panel and at a position behind a rear end portion of one of the side frame sections; and a specified vehicle component that is arranged adjacent to rear of the high-voltage component.

The high-voltage component is arranged in a vertically inclined state, a front-end portion of the high-voltage component is located higher than the rear end portion of the side frame section, and a rear end portion of the high-voltage component is located lower than the vehicle component.

That is, the high-voltage driving battery is mounted on this electric vehicle. A voltage of the high-voltage driving battery is higher than that of a battery (usually, a lead-acid battery with a voltage of 12 V) used as a power supply for an air conditioner or the like. The electric vehicle can travel by using electric power thereof. Examples of the electric vehicle are a hybrid vehicle and an electric car.

The electric vehicle includes a high-voltage component, such as a motor, an inverter, or a converter, that is connected to the high-voltage battery. Such a specified high-voltage component is arranged along the lower surface of the floor panel. The rear end portion of one of the side frame sections is located in front of the high-voltage component. Then, the specified vehicle component is arranged adjacent to the rear of the high-voltage component. That is, on a lower side of a front-end portion in a side portion of the floor panel, the high-voltage component and the vehicle component are aligned in an adjacent state in the front-rear direction.

An attachment method of the high-voltage component is devised, and the high-voltage component is arranged in the vertically inclined state. Then, the front-end portion of the high-voltage component is located higher than the rear end portion of the side frame section in front. The rear end portion of the high-voltage component is located lower than the vehicle component behind the high-voltage component.

When the front subframe is retreated, the rear end portion of the side frame section therein possibly comes into contact with the high-voltage component. In the case where the rear end portion of the side frame section and the high-voltage component are in vicinity of each other, there is a high possibility of contact. Meanwhile, it is difficult to install a protective member therebetween to prevent the contact.

To handle such a problem, in the lower structure of this electric vehicle, the high-voltage component is inclined, and the front-end portion thereof is located higher than the rear end portion of the side frame section. Thus, it is possible to avoid the contact with the rear end portion of the side frame section without providing the protective member.

Furthermore, since the rear end portion of the high-voltage component is located lower than the vehicle component behind the high-voltage component, the rear end portion of the high-voltage component is in a state of facing a position below the vehicle component. Accordingly, it is also possible to secure a space for connecting a wire, a pipe, and the like to the rear end portion of the high-voltage component.

That is, it is possible to simultaneously avoid the contact with the front subframe and secure a connection space for a harness and the like without separately providing the protective member.

In the lower structure of the electric vehicle, the high-voltage component may have a harness connection section in the front-end portion thereof, the harness connection section connecting a cable through which a current flows. The high-voltage component may be arranged in a laterally inclined state, the front-end portion of the high-voltage component may relatively be located inward in a vehicle width direction in comparison with the rear end portion of the high-voltage component.

In this case, the high-voltage component, which has the harness connection section in the front-end portion thereof, is arranged in the inclined state in the lateral direction, that is, the vehicle width direction in addition to the vertical direction. Accordingly, the front-end portion of the high-voltage component is relatively located inward in the vehicle width direction in comparison with the rear end portion thereof.

In general, when an object collides with a front side of the vehicle, there is often the case where the object collides with either one of right and left sides thereof obliquely from the front (a so-called oblique collision). During the oblique collision, a rear portion of the front subframe tends to be retreated inward in the vehicle width direction.

On the contrary, as described above, in the case where the front-end portion of the high-voltage component is relatively located inward in the vehicle width direction, the harness connection section is brought into an offset state to an inner side in the vehicle width direction. The harness connection section and the cables connected thereto are further located away from the retreated front subframe. In this way, it is possible to further effectively avoid the contact between the front subframe and each of the harness connection section and the cable connected thereto.

In the lower structure of the electric vehicle, the high-voltage component may be a high-voltage component of a water-cooling type that has a pipe connection section for connecting a cooling water pipe through which cooling water flows, and the pipe connection section may be provided in the rear end portion of the high-voltage component.

A space for connection work has to be secured around a connection portion of the cooling water pipe. In particular, the cooling water pipe has a relatively large pipe diameter. Accordingly, even in the case where the cooling water pipe can be connected, it is also necessary to secure a piping space around the pipe connection section due to limitation of a curvature radius.

To handle such a problem, as described above, when the high-voltage component is attached, the cooling water pipe can easily be connected and can easily be plumbed. In this way, it is possible to simultaneously avoid the contact with the front subframe and secure the connection space for the harness and the cooling water pipe.

In the lower structure of the electric vehicle, a tunnel section is provided in an intermediate portion in the vehicle width direction of the floor panel in a manner to extend in the front-rear direction, and the high-voltage component of the water-cooling type and the vehicle component are arranged on a side of the tunnel section. The lower structure of the electric vehicle further includes: a transmission that is arranged inside the tunnel section; a second high-voltage component of the water-cooling type that is attached to the transmission and has the pipe connection section in each of a front end portion and a rear end portion; and a motor of a water-cooling type that is arranged in front of the second high-voltage component of the water-cooling type in the tunnel section and is cooled by the cooling water. The cooling water pipe that is connected to the high-voltage component of the water-cooling type may be connected to the pipe connection section in the rear end portion of the second high-voltage component of the water-cooling type, and a second cooling water pipe that is connected to the pipe connection section in the front-end portion of the second high-voltage component of the water-cooling type may be connected to the motor.

That is, according to the lower structure of this electric vehicle, the high-voltage component of the water-cooling type and the vehicle component described above are arranged on the side of the tunnel section of the floor panel. Then, the second high-voltage component of the water-cooling type, which has the pipe connection section in each of the front-end portion and the rear end portion, is attached to the transmission, which is arranged inside the tunnel section. Furthermore, the motor of the water-cooling type is arranged in front of the second high-voltage component of the water-cooling type in the tunnel section.

The cooling water pipe that is connected to the high-voltage component of the water-cooling type is connected to the pipe connection section in the rear end portion of the second high-voltage component of the water-cooling type, and the second cooling water pipe that is connected to the pipe connection section in the front-end portion of the second high-voltage component of the water-cooling type is connected to the motor.

It is necessary to circulate and supply the cooling water into the high-voltage component of the water-cooling type, the second high-voltage component of the water-cooling type, and the motor. In regard to this point, according to this configuration, a path of the cooling water is devised such that the cooling water is circulated efficiently and each of these components can be cooled efficiently.

That is, since the high-voltage component of the water-cooling type is arranged on the side of the tunnel section, the high-voltage component of the water-cooling type is adjacent to the transmission, to which the second high-voltage component of the water-cooling type is attached. The motor is arranged in front of the second high-voltage component of the water-cooling type. Accordingly, each of the cooling water pipes connected therebetween can be plumbed in a short smooth route. As a result, the cooling water pipe can easily be connected for efficient cooling.

In particular, in the case where the high-voltage component of the water-cooling type is the converter and the second high-voltage component of the water-cooling type is the inverter, it is preferably configured that the cooling water flows in an order of the high-voltage component of the water-cooling type, the second high-voltage component of the water-cooling type, and the motor.

While the high-voltage components generate large heat generation amounts, the motor generates the largest heat generation amount, followed by the inverter. The converter generates the smaller heat generation amount than the inverter. That is, it is set that the cooling water sequentially flows in an order from the high-voltage component with the smallest heat generation amount. Therefore, it is possible to efficiently cool each of these high-voltage components.

According to the disclosed technique, it is possible to simultaneously avoid the contact with the front subframe and secure the connection space for the harness and the like without separately providing the protective member.

DETAILED DESCRIPTION

A description will hereinafter be made according to one or more aspects of the disclosed subject matter, to which the disclosed technique is applied. Each of front-rear, right-left, and up-down directions in the description will be set with a vehicle being a reference. In each of the drawings, these directions are indicated by arrows. The right-left direction corresponds to a vehicle width direction.

<Lower Structure of Electric Vehicle>

Figure 1:
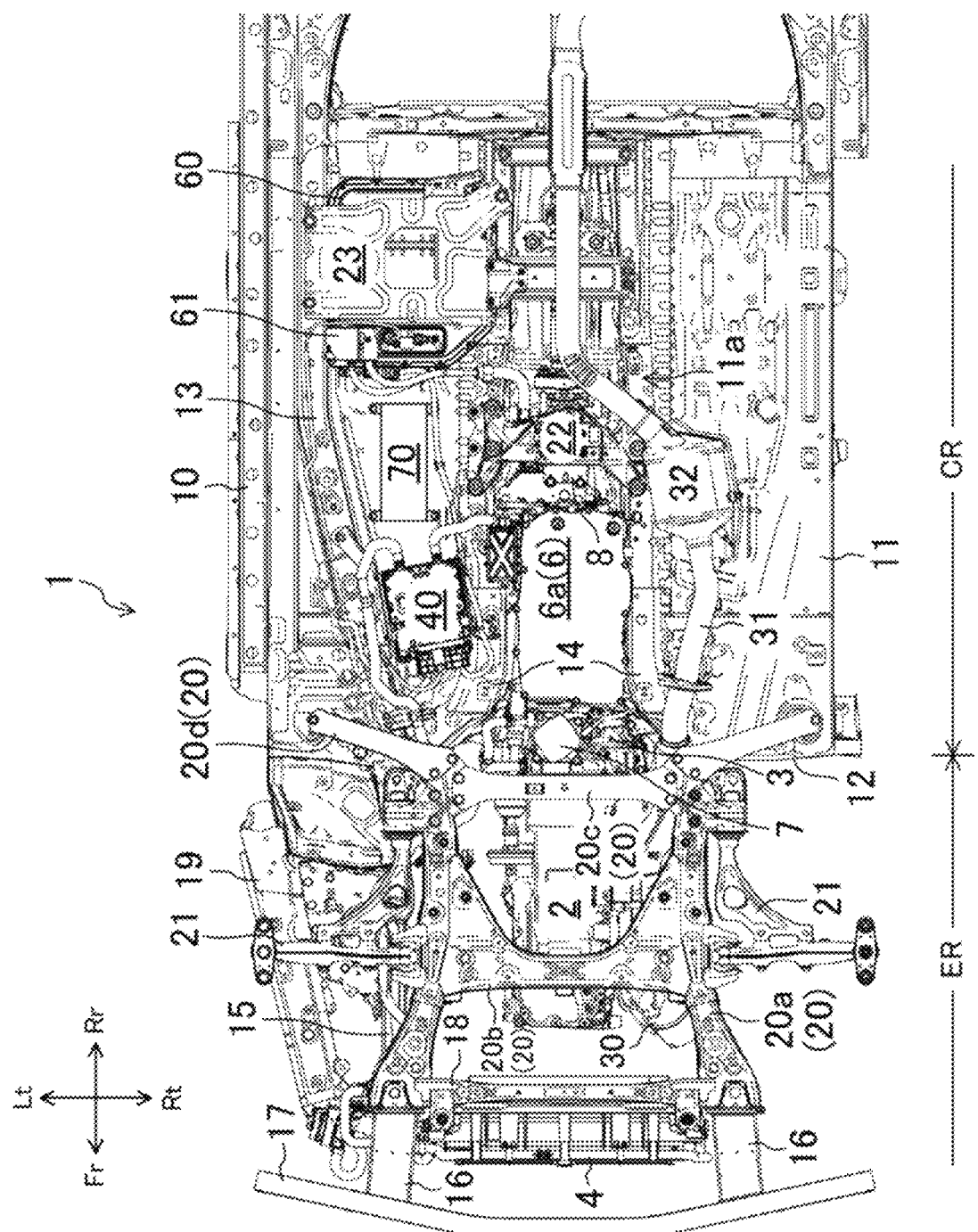
FIG. 1 is a schematic view in which a lower structure of a front portion of an electric vehicle is seen from below.

FIG. 1 illustrates a lower structure of an electric vehicle 1 according to one or more aspects of the disclosed subject matter. FIG. 1 is a schematic view in which a lower structure of a front portion of the electric vehicle 1 is seen from below. Compared to a left portion of the electric vehicle 1, a part of a right portion thereof is not illustrated in FIG. 1 for convenience. In the other drawings, some portions are also omitted appropriately.

Figure 2:
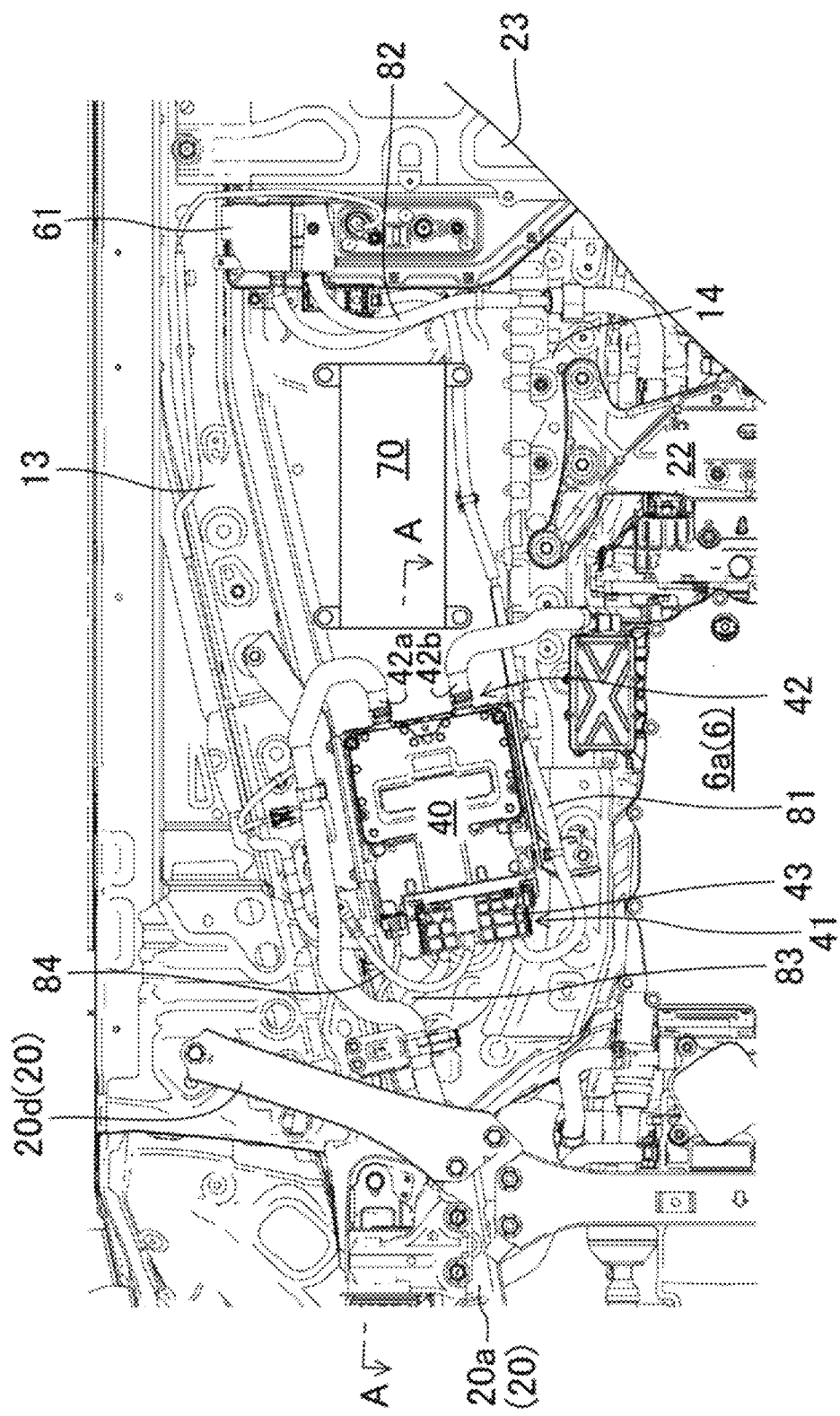
FIG. 2 is an enlarged view of a main section in FIG. 1.
Figure 3:
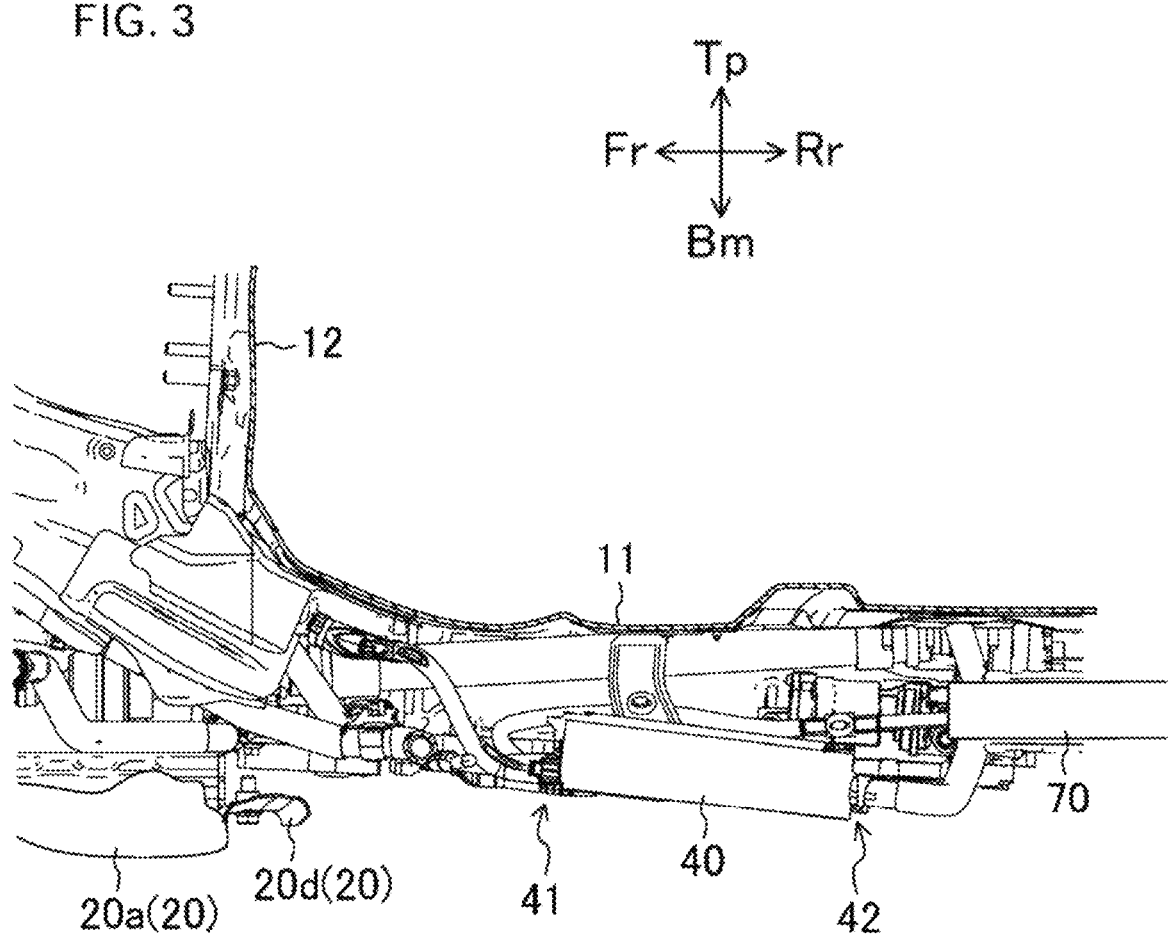
FIG. 3 is a schematic cross-sectional view of a portion that is taken along arrow A-A in FIG. 2.
Figure 4:
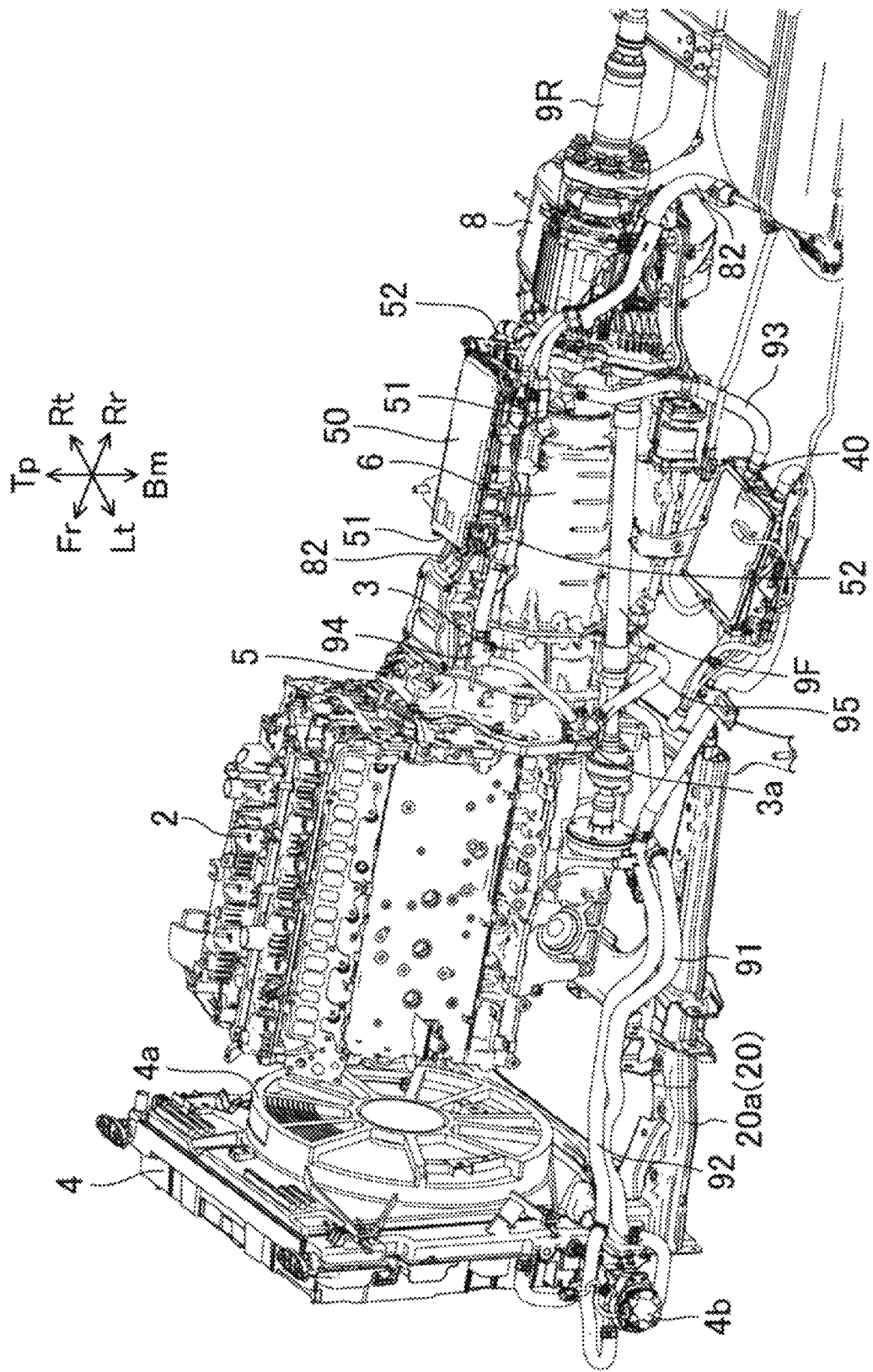
FIG. 4 is a schematic perspective view of a main section of the electric vehicle.
Figure 5:
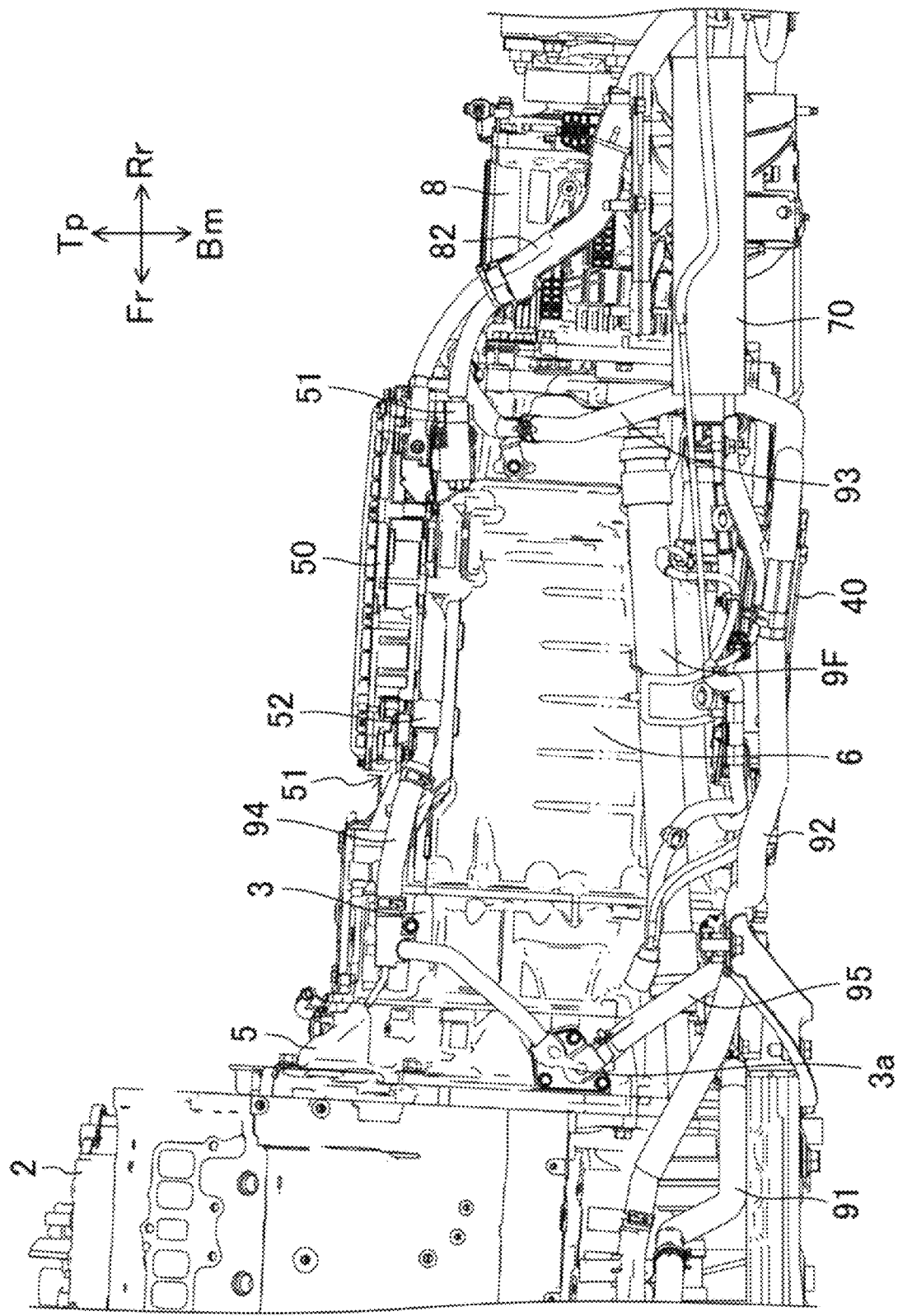
FIG. 5 is a schematic view in which the main section illustrated in FIG. 4 is seen from left.
Figure 6:
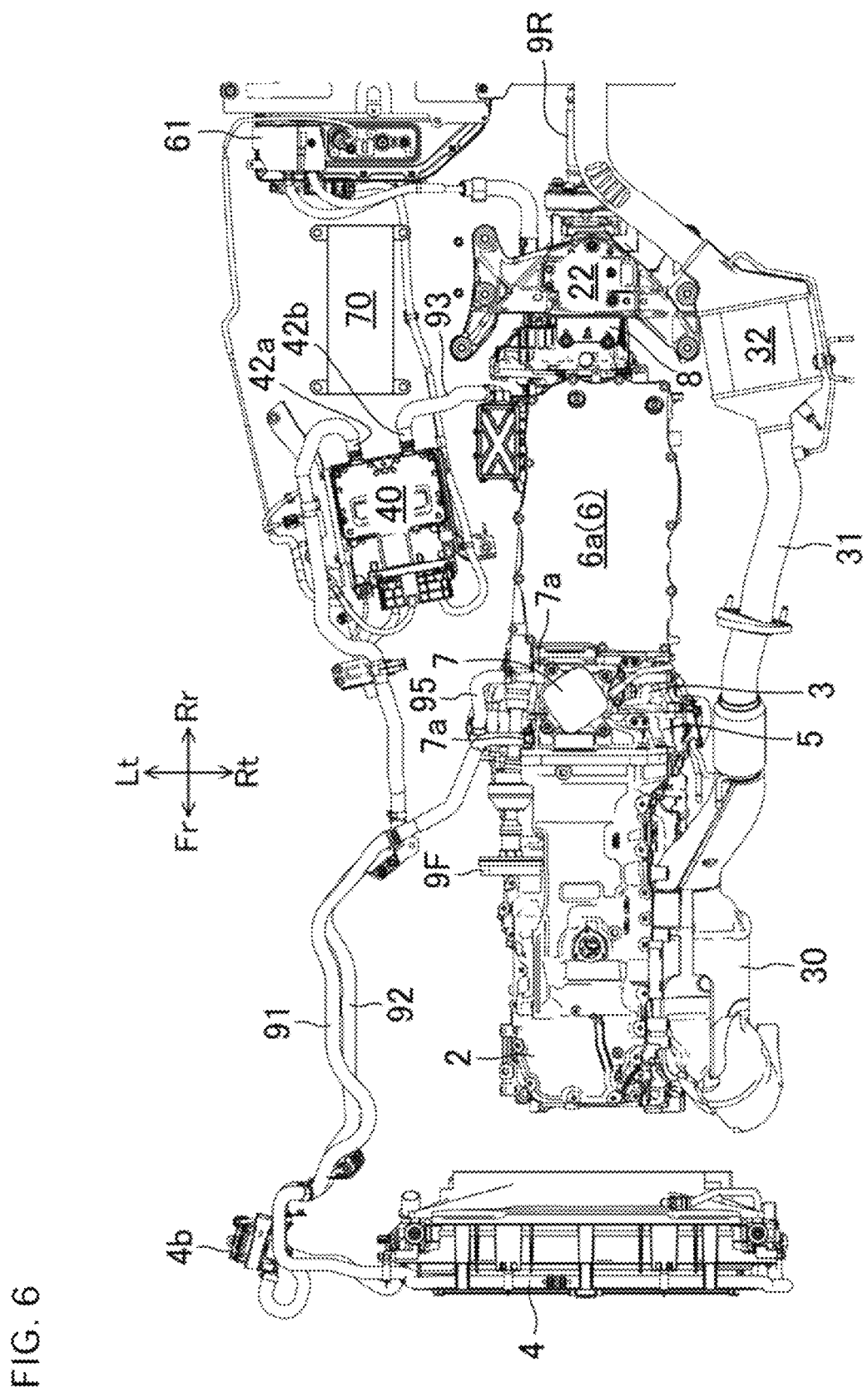
FIG. 6 is a schematic view in which the main section illustrated in FIG. 4 is seen from below.

FIG. 2 is an enlarged view of a main section in FIG. 1. FIG. 3 is a schematic cross-sectional view of a portion that is taken along arrow A-A in FIG. 2. FIG. 4 is a schematic perspective view of a main section of the electric vehicle 1. FIG. 5 is a schematic view in which the main section illustrated in FIG. 4 is seen from left. FIG. 6 is a schematic view in which the main section illustrated in FIG. 4 is seen from below.

The electric vehicle 1 is a hybrid vehicle. That is, as illustrated in FIG. 4 and the like, an engine 2 and a motor 3 are mounted as drive sources. Accordingly, the electric vehicle 1 travels by driving the engine 2 only, by driving the motor 3 only, or by driving both of the engine 2 and the motor 3. The disclosed technique is not limited to the hybrid vehicle, but can also be applied to a fully electric vehicle.

The electric vehicle 1 is a so-called FR vehicle. The electric vehicle 1 includes an engine compartment in front of a cabin and travels by driving rear wheels. The electric vehicle 1 also drives front wheels with the rear wheels when necessary (four-wheel-drive). In FIG. 1, the cabin is provided in a range indicated by CR, and the engine compartment is provided in a range indicated by ER.

As illustrated in FIG. 1, a pair of side sills 10, 10 extending in parallel in the front-rear direction is arranged on both of right and left sides of a lower portion of the cabin (a right side sill 10 is not illustrated). A substantially horizontal floor panel 11 that expands in the lower portion of the cabin is arranged between these side sills 10, 10. In an intermediate portion in the vehicle width direction of the floor panel 11, a tunnel section 11a that is recessed upward (to the cabin side) is provided in a manner to extend in the front-rear direction.

A front edge portion of the floor panel 11 is coupled to a lower edge portion of a dashboard 12 that extends in the right-left direction in a state of facing the front edge portion of the floor panel 11 in the front-rear direction. A boundary portion between the floor panel 11 and the dashboard 12 is curved upward to the front. The dashboard 12 divides a front portion of the cabin from the engine compartment. The tunnel section 11a extends beyond the dashboard 12 to the engine compartment.

In a portion between each of the side sills 10 and the tunnel section 11a in the floor panel 11, a floor side frame 13 and a tunnel side frame 14 are provided in a manner to extend in the front-rear direction. Each of these floor side frame 13 and the tunnel side frame 14 is joined to the floor panel 11 so as to form a closed cross-sectional structure.

Each of the tunnel side frames 14 is arranged along an edge of the tunnel section 11a. Each of the floor side frames 13 is arranged between respective one of the tunnel side frames 14 and respective one of the side sills 10. A front-end portion of each of the tunnel side frames 14 is connected to the adjacent floor side frame 13.

The engine 2 is vertically arranged substantially at a center in the vehicle width direction of the engine compartment. That is, the engine 2 is arranged such that a rotation axis thereof extends in the front-rear direction (see FIG. 4 and FIG. 5). A radiator 4 is arranged in front of the engine 2.

The radiator 4 is an air-cooled heat exchanger. In a state where an air introduction surface faces the front, the radiator 4 is arranged in front of the engine compartment. A fan 4a that blows air into the engine compartment is installed on a rear surface of the radiator 4 (the radiator 4 will separately be described below).

As illustrated in FIG. 1, a pair of front side frames 15, 15 extends in the front-rear direction (a right front side frame 15 is not illustrated) on both of right and left sides of the engine compartment. In a state of being curved downward, a rear end portion of each of the front side frames 15 is coupled to the front-end portion of respective one of the floor side frames 13.

A front-end portion of each of the front side frames 15 is coupled to a bumper beam 17, which extends in the right-left direction, via a crash can 16. The crash can 16 mitigates an impact received by the bumper beam 17 by a frontal collision, an offset collision, or collision from obliquely in front (an oblique collision). A crossmember 18 is hung (installed in a hung state) between the front-end portions of the front side frames 15. The radiator 4 is supported by this crossmember 18.

An apron member 19 is arranged above and on an outer side in the vehicle width direction of each of the front side frames 15. Meanwhile, a front subframe 20 is arranged below and on an inner side in the vehicle width direction of both of the front side frames 15. The front subframe 20 is arranged in a lower portion of the engine compartment, and the engine 2, a front suspension 21, and the like are supported by the front subframe 20.

The front subframe 20 is constructed of a right and left pair of side frame sections 20a, 20a, a front suspension member section 20b, a rear suspension member section 20c, a right and left pair of brace sections 20d, 20d, and the like. The front subframe 20 is configured to be bilaterally symmetrical.

Each of the side frame sections 20a extends in the front-rear direction along a lower side of respective one of the front side frames 15. In detail, each of the side frame sections 20a is located in the lower portion of the engine compartment in front of the dashboard 12, and is arranged at a lower position than the dashboard 12 and the floor panel 11.

A front-end portion of each of the side frame sections 20a is curved upward and is coupled to the front-end portion of respective one of the front side frames 15. A rear end portion of each of the side frame sections 20a is located immediately in front of and below the dashboard 12 (see FIG. 3), and is coupled to the rear end portion of respective one of the front side frames 15. The rear suspension member section 20c, which extends in the right-left direction, is hung between the rear end portions of the side frame sections 20a.

Each of the brace sections 20d is coupled to the rear end portion of respective one of the side frame sections 20a. Each of the brace sections 20d is arranged in a manner to be projected outward in the vehicle width direction from the rear end portion of respective one of the side frame sections 20a. Each of the brace sections 20d is inclined rearward. In this way, a projected end portion thereof is coupled to a lower surface of the boundary portion between the dashboard 12 and the floor panel 11.

The front suspension member section 20b is hung between intermediate portions of the side frame sections 20a. The front suspension 21 is assembled to the front subframe 20. A part (a lower arm and the like) of the front suspension 21 bulges outward in the vehicle width direction of each of the side frame sections 20a.

As illustrated in FIG. 4 and FIG. 5, the motor 3 is coupled to a rear portion of the engine 2 via a damper 5. The motor 3 is integrally constructed with the damper 5. The motor 3 is a synchronous motor of a permanent magnet type. The motor 3 is driven by inverter control.

In addition, the motor 3 generates heat when being driven. Accordingly, the motor 3 is configured that the motor 3 can be cooled by circulating cooling water (a water-cooling type). The motor 3 has a motor pipe connection section 3a in a left portion thereof (in detail, a left portion of the damper 5) for connecting a cooling water pipe through which the cooling water flows (see FIG. 4 and FIG. 5).

An AT transmission 6 (an automatic transmission) is coupled to a rear portion of the motor 3. The AT transmission 6 shifts and outputs drive power that is output from one or both of the engine 2 and the motor 3 according to a vehicle speed.

An oil pan 6a is provided in a lower portion of the AT transmission 6 to store a lubricant that is circulated and supplied to the AT transmission 6 (see FIG. 6). An oil cooler 7 is provided in front of the oil pan 6a, in detail, a portion on a lower side of the damper 5 and the motor 3. The oil cooler 7 cools the lubricant by heat exchange with the cooling water (a water-cooling type).

A transfer 8 is provided behind the AT transmission 6. A front propeller shaft 9F extends forward from a left side of the transfer 8. A rear propeller shaft 9R extends rearward from the transfer 8. The transfer 8 transfers the drive power output from the AT transmission 6 to the front wheels and the rear wheels through these front propeller shaft 9F and rear propeller shaft 9R.

The damper 5, the motor 3, the AT transmission 6, the transfer 8, and the rear propeller shaft 9R are coupled in series to the rear portion of the engine 2 and extends linearly and rearward through inside of the tunnel section 11a. The AT transmission 6 is arranged inside a front portion of the tunnel section 11a. A bracket 22 that is hung between the right and left tunnel side frames 14 is arranged on a lower side of the transfer 8. The transfer 8 is supported by this bracket 22.

An exhaust system 30 including an exhaust manifold is attached to a right side of the engine 2 (see FIG. 6). An exhaust pipe 31 extends from the exhaust system 30 toward a rear end of the electric vehicle 1. A front portion of the exhaust pipe 31 is arranged along a lower surface of the floor panel 11 that expands on a right side of the tunnel section 11a. In the tunnel section 11a, a rear portion of the exhaust pipe 31 is arranged at a position under the rear propeller shaft 9R and in a state of being in line with the rear propeller shaft 9R. A purification system 32 is installed between the front portion and the rear portion of the exhaust pipe 31.

(High-Voltage Components, Vehicle Components)

In the electric vehicle 1, vehicle components such as electrical components and a controller that are the same as those in a conventional vehicle traveling by driving the engine are installed. In addition to these vehicle components, in order to drive the motor 3, plural high-voltage components are mounted on the electric vehicle 1.

More specifically, a DC/DC converter 40 (corresponding to the "specified high-voltage component", also referred to as a converter 40), an inverter 50 (a second high-voltage component), and the like are mounted. Separately from the vehicle components, the high-voltage components are frequently assembled later in a manufacturing process due to characteristics thereof.

As a power supply of the vehicle components, a battery (usually a lead-acid battery with a voltage of 12 V, hereinafter referred to as a low-voltage battery) is mounted on the engine compartment. In addition thereto, as a power supply of the high-voltage components, a battery (a high-voltage battery 60) with a higher voltage than the above is mounted on the electric vehicle 1.

The high-voltage battery 60 with the voltage of 48 V is mounted on this electric vehicle 1 (a so-called mild hybrid vehicle). Size of the high-voltage battery 60 is relatively compact. Accordingly, as illustrated in FIG. 1, in this electric vehicle 1, the high-voltage battery 60 is arranged in an area on a left side of the tunnel section 11*a* in the floor panel 11.

In detail, in an area that expands between the left floor side frame 13 and the left tunnel side frame 14 in the lower surface of the floor panel 11 (also referred to as a left-side area), the high-voltage battery 60 is arranged on a side of a front portion of the rear propeller shaft 9R. The high-voltage battery 60 is supported by a battery bracket 23 that is hung between the floor side frame 13 and the tunnel side frame 14.

As also illustrated in FIG. 2, the high-voltage battery has a connection terminal 61 in a front-end portion thereof. A first cable 81 that is connected to the converter 40 and a second cable 82 that is connected to the inverter are connected to the connection terminal 61. As illustrated in FIG. 4 and FIG. 5, the inverter 50 is attached to an upper side of the AT transmission 6.

The inverter 50 executes switching processing to output a controlled current to the motor 3. By controlling the inverter 50, the motor 3 is driven with specified output. Thus, the inverter 50 is preferably arranged near the motor 3. For this reason, in this electric vehicle 1, the inverter 50 is attached to the upper side of the AT transmission 6. Accordingly, it is possible to shorten wiring from the inverter 50 to the motor 3. For example, the inverter 50 and the motor 3 can be connected by a bus bar. The inverter 50 is located in the back of the inside of the tunnel section 11*a*.

As illustrated in FIG. 4 and FIG. 5, the inverter 50 has an IV harness connection section 51, to which the cable is connected, in each of a front-end portion and a rear end portion thereof. The cable (the bus bar) that is connected to the motor 3 is connected to the front IV harness connection section 51. The second cable 82, which is connected to the high-voltage battery 60, is connected to the rear IV harness connection section 51.

The inverter 50 generates the heat when being actuated. Accordingly, the inverter 50 is configured that the inverter 50 can be cooled by circulating cooling water (a water-cooling type). This inverter 50 has an IV pipe connection section 52, to which a cooling water pipe is connected, in each of the front-end portion and the rear end portion thereof.

As illustrated in FIG. 1 and FIG. 2, in a range in front of the high-voltage battery 60 of the left-side area, the converter 40 and a positive temperature coefficient (PTC) heater 70 (corresponding to the "specified vehicle component") are arranged along the lower surface of the floor panel 11. The PTC heater 70 is arranged adjacent to and in front of the high-voltage battery 60 and behind the converter 40.

The PTC heater 70 is a heater that uses the low-voltage battery as a power supply. The PTC heater 70 is installed to heat cooling water of an air conditioner and support heating of the cabin. In a state where the cable is connected, the PTC heater 70 is attached to the lower surface of the floor panel 11. In the left-side area, the PTC heater 70 is arranged in a range on a side of the transfer 8.

The converter 40 is a rectangular plate-shaped component with such an outer shape that each of longitudinal and lateral lengths is sufficiently greater than a thickness (see FIG. 4). The converter 40 steps down the voltage of the high-voltage battery 60 and outputs a DC current to the low-voltage battery. The converter 40 generates the heat when being actuated. Accordingly, the converter 40 is configured that the converter 40 can be cooled by circulating cooling water (a water-cooling type).

In this way, as illustrated in FIG. 2, the converter 40 has: a CV harness connection section 41 for connecting the cable, through which the current flows; and a CV pipe connection section 42 for connecting the cooling water pipe, through which the cooling water flows. The CV harness connection section 41 is provided in a front-end portion of the converter 40, and the CV pipe connection section 42 is provided in a rear end portion of the converter 40.

The CV harness connection section 41 is provided with: the first cable 81 that extends from the high-voltage battery 60; a third cable 83 that extends toward the low-voltage battery side; each terminal, to which a respective ground wire 84 grounded to the floor panel 11 is connected; and a protective cover 43 that covers these.

The CV pipe connection section 42 is provided with: an inlet port 42*a* from which the cooling water flows in; and an outlet port 42*b* from which the cooling water flows out. The inlet port 42*a* and the outlet port 42*b* of the converter 40 are projected rearward from positions, which are separated from each other, in the rear end portion of the converter 40.

In the left-side area, the converter 40 is arranged in a range on a side of the AT transmission 6, that is, a front-end portion of the floor panel 11. Accordingly, the front subframe 20, in detail, the rear end portion of the left side frame section 20*a* is located in front of the converter 40.

(Devise to Attach Converter 40)

Due to assembly, in the manufacturing process, the converter 40 is attached to the PTC heater 70 later. In addition, work of connecting each of the cables and each of the cooling water pipes is also performed after the converter 40 is arranged at the above-described specified position.

Accordingly, in order to connect the cooling water pipe to each of the inlet port 42*a* and the outlet port 42*b*, a space for inserting the cooling water pipe in each of these inlet port 42*a* and outlet port 42*b* is required behind the converter 40. In particular, a pipe diameter of the cooling water pipe is relatively large. Thus, even in the case where the cooling water pipe can be inserted, it is required to secure a piping space around the CV pipe connection section 42 due to limitation of a curvature radius.

In regard to this point, the same applies to the cable to be connected instead of the cooling water pipe to be connected. The cable that is connected to the converter 40 is thicker than a normal cable. Accordingly, it is also required to secure a piping space for the cable around the CV harness connection section 41 due to limitation of a curvature radius.

Meanwhile, in this electric vehicle 1, the PTC heater 70 is located in vicinity of and behind the converter 40. Thus, the converter 40 cannot be arranged along the floor panel 11 in the same way as the PTC heater 70.

It is considered to arrange the converter 40 below the PTC heater 70 in an offset manner. However, in this electric vehicle 1, as described above, the side frame section 20*a* of the front subframe 20 is located in front of the converter 40. There is a case where the front subframe 20 is retreated when the electric vehicle 1 is in the collision.

In such a case, a possibility that the rear end portion of the left side frame section 20*a* comes into contact with the converter 40 is increased. In particular, a connected portion of each of the first cable 81 and the third cable 83 to the CV harness connection section 41 has opposite potential from the grounded side frame section 20*a*. Accordingly, these are short-circuited (shorted) when contacting each other.

It is also considered to provide a protector between the front subframe 20 and the converter 40 in order to prevent a contact with the converter 40. However, it is difficult to install the protector due to a small space between the front subframe 20 and the converter 40. Even in the case where the protector is installed, the protector with superior strength is required, which increases cost of members and increases the number of components. The number of man-hours associated with the installation thereof is also increased.

In view of the above, a method for attaching the converter 40 is devised to simultaneously avoid the contact with the front subframe 20 and secure a space for connecting the harness and the like without providing such a protector.

More specifically, as illustrated in FIG. 3, the converter 40 is arranged in an inclined state in a vertical direction (the up-down direction) such that the front-end portion thereof is located higher than the rear end portion of the side frame section 20a and the rear end portion thereof is located lower than the PTC heater 70.

In this way, the CV harness connection section 41 is located higher than the rear end portion of the side frame section 20a, and each of the cables connected to the CV harness connection section 41 can be wired to be located higher to the front. As a result, even when the front subframe 20 is retreated, the rear end portion of the left side frame section 20a including the CV harness connection section 41 and each of the cables connected thereto can be avoided from contacting the converter 40. In addition, the first cable 81 and the third cable 83, which have large cable diameters, can easily be wired.

Meanwhile, the CV pipe connection section 42 is located lower than the PTC heater 70, and the cooling water pipe can be connected to each of the inlet port 42a and the outlet port 42b. Since the positions of the inlet port 42a and the outlet port 42b are lowered to the rear, it is possible to further easily connect the cooling water pipes thereto. As a result, it is possible to simultaneously avoid the contact with the front subframe 20 and secure the connection space for the harness and the like without separately providing the protector.

Here, an inclination angle of the converter 40 (for example, an inclination angle of a wall surface of the converter 40 with respect to the floor panel 11) is preferably set within a range of 10° or smaller. In the case where the inclination angle is larger than 10°, there is a possibility that the air is accumulated in a path, through which the cooling water flows, inside the converter 40. Within the range of 10° or smaller, it is possible to avoid the accumulation of the air.

Furthermore, as illustrated in FIG. 2 and the like, in order to further effectively avoid the contact with the front subframe 20, the converter 40 is arranged in an inclined state in a lateral direction (the right-left direction). More specifically, the converter 40 is arranged in the inclined state such that the front-end portion thereof is relatively located inward in the vehicle width direction in comparison with the rear end portion thereof.

In general, when an object collides with a front side of the vehicle, there is often the case where the object collides with either one of the right and left sides thereof obliquely from the front (the so-called oblique collision). During the oblique collision, a rear portion of the front subframe 20 tends to be retreated inward in the vehicle width direction.

On the contrary, as described above, in the case where the front-end portion of the converter 40 is relatively located inward in the vehicle width direction, the CV harness connection section 41 is brought into the offset state to the inner side in the vehicle width direction. In relation to the retreated front subframe 20, the CV harness connection section 41 and each of the cables connected thereto are further located away from the front subframe 20. In this way, it is possible to further effectively avoid the contact of the front subframe 20 with the CV harness connection section 41 and each of the cables connected thereto.

(Devise of Cooling Water Circulation Path)

As described above, the motor 3, the oil cooler 7, the inverter 50, and the converter 40 are of the water-cooling type. Accordingly, it is necessary to circulate and supply the cooling water to each of these. In regard to this point, in this electric vehicle 1, the cooling water path is devised such that the cooling water can efficiently be circulated and each of the above components can efficiently be cooled.

As illustrated in FIG. 4, FIG. 5, and FIG. 6, a cooling water pipe (an inlet pipe 91) through which the cooling water to flow into the radiator 4 flows and a cooling water pipe (an outlet pipe 92) through which the cooling water that has flowed out of the radiator 4 flows are connected to the radiator 4. Each of the inlet pipe 91 and the outlet pipe 92 extends rearward through a left side of the lower portion of the engine compartment. A water pump 4b for delivering the cooling water is arranged on a left side of the radiator 4. The water pump 4b is arranged in the outlet pipe 92.

A rear end portion of the outlet pipe 92 is connected to the inlet port 42a of the converter 40 along the lower surface of the floor panel 11. Meanwhile, a rear end portion of the inlet pipe 91 is connected to an OC pipe connection section 7a (an outlet port) of the oil cooler 7. A cooling water pipe (a first cooling water pipe 93) that is connected to the outlet port 42b of the converter 40 is connected to the IV pipe connection section 52 (the inlet port) in the rear end portion of the inverter 50.

As illustrated in FIG. 4 and FIG. 5, a cooling water pipe (a second cooling water pipe 94) that is connected to the IV pipe connection section 52 (the outlet port) in the front-end portion of the inverter 50 is connected to an MT pipe connection section 3a (an inlet port) of the motor 3. As illustrated in FIG. 6, a cooling water pipe (a third cooling water pipe 95) that is connected to the MT pipe connection section 3a (the outlet port) of the motor 3 is connected to the OC pipe connection section 7a (the inlet port) of the oil cooler 7.

The converter 40 is adjacent to the left of the AT transmission 6, to which the inverter 50 is attached. The motor 3 is adjacent to the front of the inverter 50. The oil cooler 7 is adjacent to the bottom of the motor 3. Accordingly, each of the cooling water pipes connected therebetween, that is, the first cooling water pipe 93, the second cooling water pipe 94, and the third cooling water pipe 95 can be piped in a short smooth route. In this way, the cooling water pipes can easily be connected for efficient cooling.

In addition, it is set that the cooling water that has been cooled by the radiator 4 flows through and circulates the converter 40, the inverter 50, the motor 3, and the oil cooler 7 in this order. While the high-voltage components generate large heat generation amounts, the motor 3 generates the largest heat generation amount, followed by the inverter 50. The converter 40 generates the smaller heat generation amount than the inverter 50.

That is, it is set that the cooling water sequentially flows from the high-voltage component with the smallest heat generation amount to the high-voltage component with the largest heat generation amount. Thus, it is possible to efficiently cool each of these high-voltage components.

<Verification of Contact Avoidance>

A case where the above-described electric vehicle 1 is in an oblique frontal collision from the left was assumed, and behavior of the front subframe 20 was analyzed by a simulation.

Figure 7:
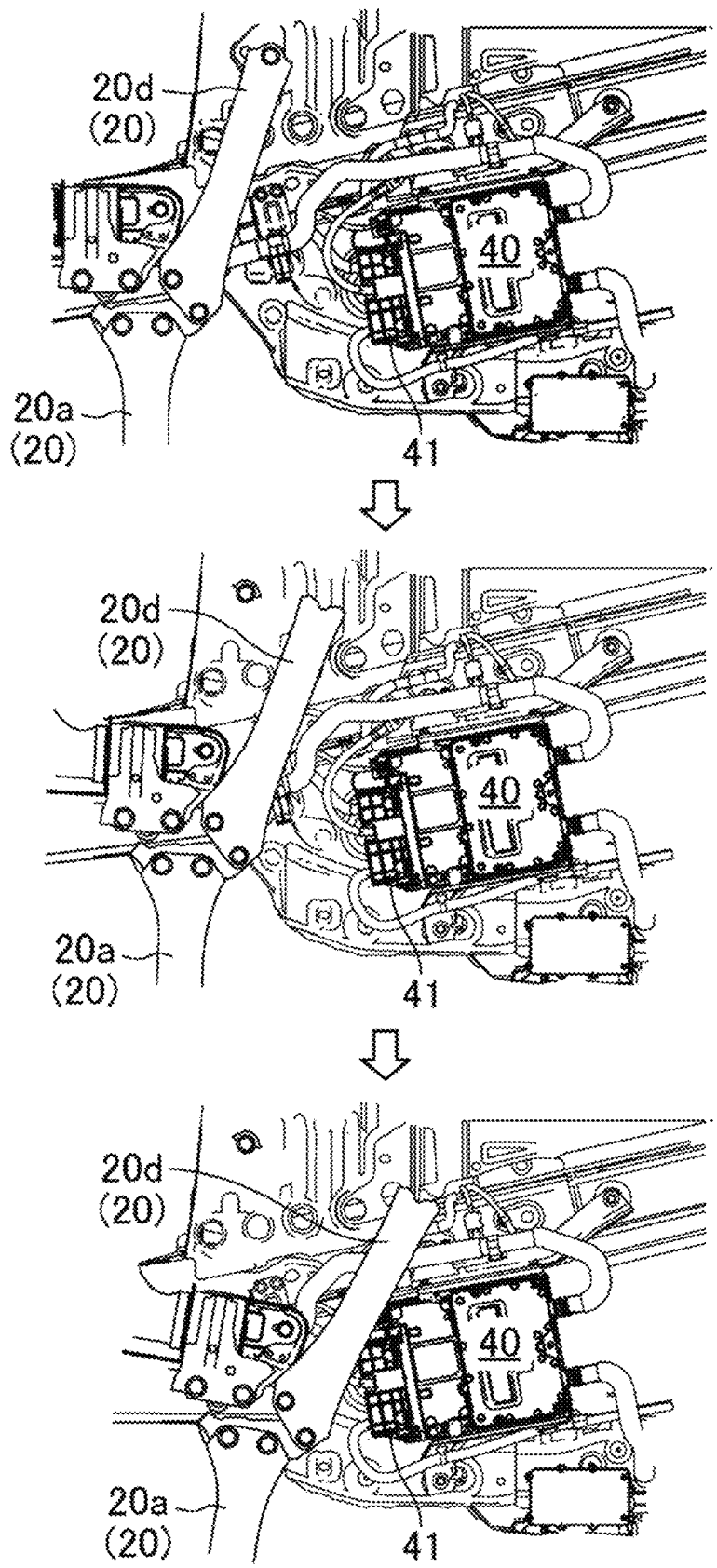
FIG. 7 includes views in which a main section is seen from below, and illustrates a temporal change before/after an oblique collision.
Figure 8:
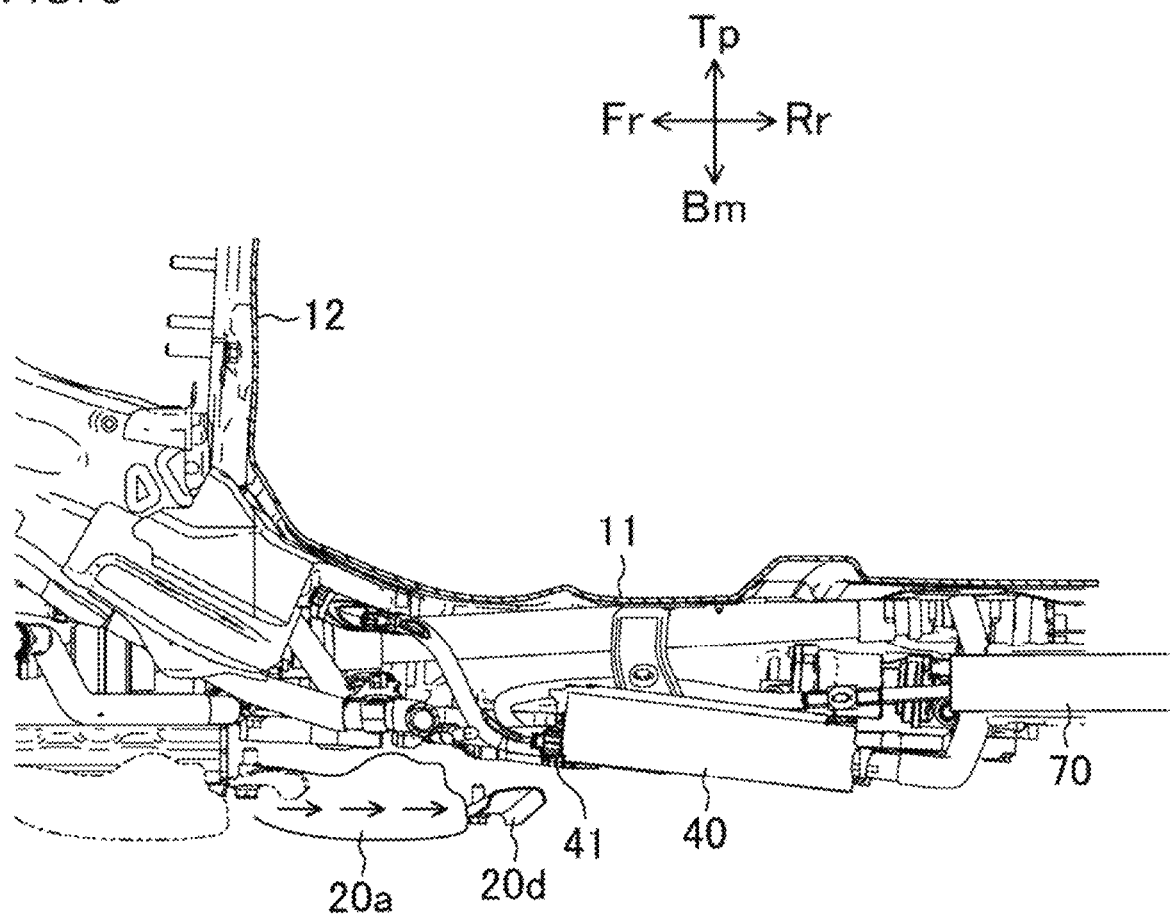
FIG. 8 is view in which a main section is seen from the left, and illustrates behavior of a front subframe during the oblique collision.

FIG. 7 and FIG. 8 illustrate an example of the analysis result. FIG. 7 includes views in which a main section is seen from below, and illustrate a temporal change before/after the oblique collision. FIG. 8 is view in which a main section is seen from the left, and, corresponding to FIG. 7, schematically illustrates movement of the front subframe 20.

A top drawing in FIG. 7 illustrates a state before the oblique collision. A middle drawing in FIG. 7 illustrates a state immediately after the oblique collision. A bottom drawing in FIG. 7 illustrates a state after the oblique collision. Due to the oblique collision, a fastening portion of the front subframe 20, such as the left brace section 20d, is fractured. Then, the rear end portion on the left side of the front subframe 20, in detail, the side frame section 20a and the brace section 20d are retreated while being slightly displaced inward in the vehicle width direction.

At this time, the front-end portion of the converter 40 is inclined upward and is located at the higher position than the rear end portion on the left side of the front subframe 20. Thus, as illustrated in FIG. 8, the rear end portion on the left side of the front subframe 20 enters below the converter 40, in detail, the CV harness connection section 41.

As a result, even in the case where the rear end portion on the left side of the front subframe 20 is retreated to a position at which the rear end portion interferes with the converter 40, it is possible to maintain a non-contact state therebetween. Since the front subframe 20 and the CV harness connection section 41, which have opposite potentials to each other, do not come into contact with each other, short-circuiting (shorting) can be avoided.

The disclosed technique is not limited to the above-described aspects and includes various configurations other than that described herein. For example, the PTC heater is exemplified as the specified vehicle component. However, the specified vehicle component is not limited to the PTC heater. In addition, the case where the DC/DC converter and the PTC heater are arranged on the left side of the tunnel section is exemplified. However, the arrangement on the right and left sides of the tunnel section may be reversed.

What is claimed is:

1. A lower structure of an electric vehicle on which a high-voltage driving battery is mounted and which can travel by using electric power thereof, the lower structure of the electric vehicle comprising:
    a floor panel that expands in a lower portion of a cabin;
    a dashboard that continues from a front edge portion of the floor panel and divides a front portion of the cabin;
    a front subframe that has a right and left pair of side frame sections, each of which extends in a front-rear direction at a position in front of the dashboard, and a rear end portion of each which is located below the dashboard;
    a specified high-voltage component that is connected to the high-voltage battery and is arranged along a lower surface of the floor panel and at a position behind a rear end portion of one of the side frame sections; and
    a specified vehicle component that is arranged adjacent to rear of the high-voltage component, wherein
    adjacent to a rear end portion of the high-voltage component, wherein the high-voltage component is arranged in a vertically inclined state, a front-end portion of the high-voltage component is located higher than the rear end portion of the side frame section, and the rear end portion of the high-voltage component is located lower than the vehicle component.

2. The lower structure of the electric vehicle according to claim 1, wherein
    the high-voltage component has a harness connection section in the front-end portion thereof, the harness connection section connecting a cable through which a current flows, and
    the high-voltage component is arranged in a laterally inclined state, the front-end portion of the high-voltage component is relatively located inward in a vehicle width direction in comparison with the rear end portion of the high-voltage component.

3. The lower structure of the electric vehicle according to claim 1, wherein
    the high-voltage component is a high-voltage component of a water-cooling type that has a pipe connection section for connecting a cooling water pipe through which cooling water flows, and
    the pipe connection section is provided in the rear end portion of the high-voltage component.

4. The lower structure of the electric vehicle according to claim 2, wherein
    the high-voltage component is a high-voltage component of a water-cooling type that has a pipe connection section for connecting a cooling water pipe through which cooling water flows, and
    the pipe connection section is provided in the rear end portion of the high-voltage component.

5. The lower structure of the electric vehicle according to claim 3,
    wherein a tunnel section is provided in an intermediate portion in the vehicle width direction of the floor panel in a manner to extend in the front-rear direction, and the high-voltage component of the water-cooling type and the vehicle component are arranged on a side of the tunnel section, the lower structure of the electric vehicle further comprising:
    a transmission that is arranged inside the tunnel section;
    a second high-voltage component of the water-cooling type that is attached to the transmission and has the pipe connection section in each of a front-end portion and a rear end portion; and
    a motor of a water-cooling type that is arranged in front of the second high-voltage component of the water-cooling type in the tunnel section and is cooled by the cooling water, wherein
    the cooling water pipe that is connected to the high-voltage component of the water-cooling type is connected to the pipe connection section in the rear end portion of the second high-voltage component of the water-cooling type, and a second cooling water pipe that is connected to the pipe connection section in the front-end portion of the second high-voltage component of the water-cooling type is connected to the motor.

6. The lower structure of the electric vehicle according to claim 4,
    wherein a tunnel section is provided in an intermediate portion in the vehicle width direction of the floor panel in a manner to extend in the front-rear direction, and the high-voltage component of the water-cooling type and the vehicle component are arranged on a side of the tunnel section, the lower structure of the electric vehicle further comprising:

a transmission that is arranged inside the tunnel section;

a second high-voltage component of the water-cooling type that is attached to the transmission and has the pipe connection section in each of a front-end portion and a rear end portion; and a motor of a water-cooling type that is arranged in front of the second high-voltage component of the water-cooling type in the tunnel section and is cooled by the cooling water, wherein the cooling water pipe that is connected to the high-voltage component of the water-cooling type is connected to the pipe connection section in the rear end portion of the second high-voltage component of the water-cooling type, and a second cooling water pipe that is connected to the pipe connection section in the front-end portion of the second high-voltage component of the water-cooling type is connected to the motor.

7. The lower structure of the electric vehicle according to claim 5, wherein the high-voltage component of the water-cooling type is a converter, and the second high-voltage component of the water-cooling type is an inverter, and the cooling water flows in an order of the high-voltage component of the water-cooling type, the second high-voltage component of the water-cooling type, and the motor.

8. The lower structure of the electric vehicle according to claim 6, wherein the high-voltage component of the water-cooling type is a converter, and the second high-voltage component of the water-cooling type is an inverter, and the cooling water flows in an order of the high-voltage component of the water-cooling type, the second high-voltage component of the water-cooling type, and the motor.

9. A hybrid-electric vehicle, comprising:
a first drive source corresponding to an engine;
a second drive source corresponding to a motor; and
a lower structure on which a high-voltage driving battery is mounted, and wherein the hybrid-electric vehicle can travel by using electric power thereof, the lower structure including
a floor panel that expands in a lower portion of a cabin;
a dashboard that continues from a front edge portion of the floor panel and divides a front portion of the cabin;
a front subframe that has a right and left pair of side frame sections, each of which extends in a front-rear direction at a position in front of the dashboard, and a rear end portion of each which is located below the dashboard;
a specified high-voltage component that is connected to the high-voltage battery and is arranged along a lower surface of the floor panel and at a position behind a rear end portion of one of the side frame sections; and
a specified vehicle component that is arranged adjacent to a rear end portion of the high-voltage component, wherein the high-voltage component is arranged in a vertically inclined state, a front-end portion of the high-voltage component is located higher than the rear end portion of the side frame section, and the rear end portion of the high-voltage component is located lower than the vehicle component.

10. The hybrid-electric vehicle according to claim 9, wherein the high-voltage component has a harness connection section in the front-end portion thereof, the harness connection section connecting a cable through which a current flows, and the high-voltage component is arranged in a laterally inclined state, the front-end portion of the high-voltage component is relatively located inward in a vehicle width direction in comparison with the rear end portion of the high-voltage component.

11. The hybrid-electric vehicle according to claim 9, wherein the high-voltage component is a high-voltage component of a water-cooling type that has a pipe connection section for connecting a cooling water pipe through which cooling water flows, and the pipe connection section is provided in the rear end portion of the high-voltage component.

12. The hybrid-electric vehicle according to claim 10, wherein the high-voltage component is a high-voltage component of a water-cooling type that has a pipe connection section for connecting a cooling water pipe through which cooling water flows, and the pipe connection section is provided in the rear end portion of the high-voltage component.

13. The hybrid-electric vehicle according to claim 11, wherein a tunnel section is provided in an intermediate portion in the vehicle width direction of the floor panel in a manner to extend in the front-rear direction, and the high-voltage component of the water-cooling type and the vehicle component are arranged on a side of the tunnel section, the lower structure further including:

a transmission that is arranged inside the tunnel section;

a second high-voltage component of the water-cooling type that is attached to the transmission and has the pipe connection section in each of a front-end portion and a rear end portion; and a motor of a water-cooling type that is arranged in front of the second high-voltage component of the water-cooling type in the tunnel section and is cooled by the cooling water, wherein the cooling water pipe that is connected to the high-voltage component of the water-cooling type is connected to the pipe connection section in the rear end portion of the second high-voltage component of the water-cooling type, and a second cooling water pipe that is connected to the pipe connection section in the front-end portion of the second high-voltage component of the water-cooling type is connected to the motor.

14. The hybrid-electric vehicle according to claim 12, wherein a tunnel section is provided in an intermediate portion in the vehicle width direction of the floor panel in a manner to extend in the front-rear direction, and the high-voltage component of the water-cooling type and the vehicle component are arranged on a side of the tunnel section, the lower structure further including:

a transmission that is arranged inside the tunnel section;

a second high-voltage component of the water-cooling type that is attached to the transmission and has the pipe connection section in each of a front-end portion and a rear end portion; and a motor of a water-cooling type that is arranged in front of the second high-voltage component of the water-cooling type in the tunnel section and is cooled by the cooling water, wherein the cooling water pipe that is connected to the high-voltage component of the water-cooling type is connected to the pipe connection section in the rear end portion of the second high-voltage component of the water-cooling type, and a second cooling water pipe that is connected to the pipe connection section in the front-end portion of the second high-voltage component of the water-cooling type is connected to the motor.

15. The hybrid-electric vehicle according to claim 13, wherein the high-voltage component of the water-cooling type is a converter, and the second high-voltage component of the water-cooling type is an inverter, and the cooling water flows in an order of the high-voltage component of the water-cooling type, the second high-voltage component of the water-cooling type, and the motor.

16. The hybrid-electric vehicle according to claim 14, wherein the high-voltage component of the water-cooling type is a converter, and the second high-voltage component of the water-cooling type is an inverter, and the cooling water flows in an order of the high-voltage component of the water-cooling type, the second high-voltage component of the water-cooling type, and the motor.

17. An electric vehicle, comprising:

a drive source corresponding to a motor; and a lower structure on which a high-voltage driving battery is mounted, wherein the electric vehicle can travel by using electric power of the high voltage driving battery, the lower structure including a floor panel that expands in a lower portion of a cabin;

a dashboard that continues from a front edge portion of the floor panel and divides a front portion of the cabin;

a front subframe that has a right and left pair of side frame sections, each of which extends in a front-rear direction at a position in front of the dashboard, and a rear end portion of each which is located below the dashboard;

a specified high-voltage component that is connected to the high-voltage battery and is arranged along a lower surface of the floor panel and at a position behind a rear end portion of one of the side frame sections; and a specified vehicle component that is arranged adjacent to a rear end portion of the high-voltage component, wherein the high-voltage component is arranged in a vertically inclined state, a front-end portion of the high-voltage component is located higher than the rear end portion of the side frame section, and the rear end portion of the high-voltage component is located lower than the vehicle component.

* * * * *